United States Patent [19]

Horikawa et al.

[11] Patent Number: 4,860,114
[45] Date of Patent: Aug. 22, 1989

[54] METHOD AND APPARATUS FOR EXPANDING TWO-DIMENSIONAL COMPRESSIONAL CODE

[75] Inventors: Ethuo Horikawa, Minamiashigara; Hidefumi Masuzaki, Odawara, both of Japan

[73] Assignee: Hitachi, Ltd., Tokyo, Japan

[21] Appl. No.: 122,697

[22] Filed: Nov. 19, 1987

[30] Foreign Application Priority Data

Nov. 29, 1986 [JP] Japan .................. 61-283162

[51] Int. Cl.$^4$ .............................................. H04N 1/41
[52] U.S. Cl. .................. 358/426; 358/261.2; 375/122
[58] Field of Search .................. 358/260, 261; 375/122

[56] References Cited

U.S. PATENT DOCUMENTS

| | | | |
|---|---|---|---|
| 3,694,581 | 9/1972 | Fletcher | 375/122 |
| 4,115,815 | 9/1978 | Nakagome et al. | 358/261 |
| 4,546,342 | 10/1985 | Weaver | 375/122 |
| 4,568,983 | 2/1986 | Bobick | 358/261 |
| 4,626,921 | 12/1986 | Ohtani et al. | 358/260 |
| 4,743,973 | 5/1988 | Endo | 358/260 |
| 4,750,043 | 6/1988 | Hisada et al. | 358/263 |
| 4,760,459 | 7/1988 | Sato | 358/260 |

Primary Examiner—Edward L. Coles, Sr.
Assistant Examiner—Jerome Grant
Attorney, Agent, or Firm—Antonelli, Terry & Wands

[57] ABSTRACT

In an MR code expanding apparatus, a reference line processing circuit shifts reference line data bit-serially and at the same time, searches for a color changing point of the reference line data at seven successive picture element positions in parallel. An output data producing circuit produces, bit-serially and in synchronism with the shifting of the reference line data, expanded line data of each picture element corresponding to each reference line picture element arriving at the center of these seven picture element positions. A code analyzing circuit supplies the reference line processing circuit with a signal which designates one of these seven picture element positions at which the color changing point is to be detected. A signal which represents detection of the color changing point at the designated picture element position is used for controlling the state transition of the expanding operation.

10 Claims, 7 Drawing Sheets

METHOD AND APPARATUS FOR EXPANDING TWO-DIMENSIONAL COMPRESSIONAL CODE

BACKGROUND OF THE INVENTION

This invention relates to a method and apparatus for expanding or decoding binary image data coded in a two-dimensional compressional code, such as a MR code, to original image data, and will be suitable, for example, for expanding the data which is transmitted by a high speed facsimile apparatus or read from an optical disk, a magnetic disk, or the like, and which has been coded in the code described above.

The MR (Modified READ) code is a two-dimensional compressional code for binary image data that is recommended by CCITT Recommendation T.4 for GIII facsimile apparatuses. More specifically, the MR coding is a line-by-line coding method in which the position of each changing picture element on the current or coding line is coded with respect to the position of a corresponding reference element situated on either the coding line or the reference line which lies immediately above the coding line. After the coding line has been coded it becomes the reference line for the next coding line. Since an example of an MR coding apparatus is described in detail in Japanese Patent Laid-Open No. 256274/1985, only the outline of the MR coding will be described herein to an extent necessary for understanding extension processing.

FIGS. 1A and 1B show the summary of the rule for MR coding and symbols in these drawings have the following meaning.

$a_0$: The reference or starting changing element on the coding line. At the start of the coding line $a_0$ is set on an imaginary white changing element situated just before the first element on the line. During the coding of the coding line, the position of $a_0$ is defined by the previous coding mode.

$a_1$: The next changing element to the right of $a_0$ on the coding line.

$a_2$: The next changing element to the right of $a_1$ on the coding line.

$b_1$: The first changing element on the reference line to the right of $a_0$ and of opposite color to $a_0$.

$b_2$: The next changing element to the right of $b_1$ on the reference line.

A changing element is defined as a picture element whose color (i.e. black or white) is different from that of the previous picture element along the same scan line. In FIG. 1B, the expression "$a_1b_1=0$", "$a_1b_1=1$", or the like, represents that the distance between $a_1$ and $b_1$ is 0 picture element (pixel) or 1 picture element, or the like. Furthermore, the expression $M(a_0a_1)$ and $M(a_1a_2)$ represent the MH (Modified Huffman) codes corresponding to the number of pixels (or run length) from $a_0$ to $a_1$ and from $a_1$ to $a_2$, respectively, and its coding rule, too, is described in detail in the afore-mentioned CCITT Recommendation T.4.

The MR coding is broadly classified into three modes. A pass mode identifies a mode where $b_2$ lies to the left of $a_1$ and the code in this mode is determined uniquely irrespective of the distance. A horizontal mode identifies a mode where $b_2$ is at the same position as, or to the right of, $a_1$ and the distance between $a_1$ and $b_1$ is at least four pixels. The code in this mode represents the distances between $a_0$ and $a_1$ and between $a_1$ and $a_2$. A vertical mode identifies a mode other than the two modes described above, where $b_2$ is at the same position as, or to the right of, $a_1$ and moreover, the distance between $a_1$ and $b_1$ is at most three pixels. The code in this mode represents the relative position of $a_1$ to $b_1$. When one coding is completed, $a_0$ is shifted to the position of $b_2$ in the pass mode, to the position of $a_2$ in the horizontal mode and to the position of $a_1$ in the vertical mode in order to carry out the next coding. FIG. 1C shows a flowchart of this coding procedure.

FIG. 2 shows a basic flowchart of the expanding procedure of the MR code. In the drawing, a reference line changing point search mode is a mode which indicates whether an element changing point (i.e. point at which the picture element color changes) from white to black or a changing point from black to white is to be searched for when the reference line is searched for an element changing point while outputting dot data after detection of a V code or P code. An EOL code is a code which represents the end of a line which is added immediately after a series of codes corresponding to the image data of an entire line.

In a facsimile apparatus utilizing a telephone line or a slow leased line, expanding has been effected through executing sequentially numerous steps obtained by fractionating the flowchart of FIG. 2 by means of a program-controlled microprocessor. In order to reduce a long processing time necessary for sequential processing by the software described above, Japanese Patent Laid-Open No. 194465/1983 proposes in its FIG. 4 an apparatus comprising the combination of a program-controlled processing circuit with an exclusive processing circuit for determining the position of the picture element changing point. In this apparatus, the program-controlled processing circuit extracts the data on the reference line by a predetermined length and writes it into a shift register in the exclusive processing circuit. When the program-controlled processing circuit detects the existence of a picture element changing point, the reference line data in the shift register is shifted out bit by bit and the existence of the picture element change is inspected at its output end. The shift length till detection of the picture element change is then sent as the position data of the picture element changing point to the program-controlled processing apparatus. The program-controlled processing apparatus generates dot data of the output line by use of the picture element changing point position data and the output of a decoding circuit.

In the facsimile apparatus utilizing the telephone line or the slow leased line, the transmission rate of the line is in the order of from 1/10 to 1/100 of the processing speed inside the apparatus. Accordingly, even if the MR code is expanded sequentially to the dot data by program control, the expanding processing speed does not become a problem. However, in the case of high speed facsimile using a high speed line or an image file system using an optical disk or a magnetic disk, the expanding processing speed must be improved drastically. Though the system which sequentially expands the code to the dot data by program control provides the advantage that the necessary amount of hardware is small, a drastic improvement in its processing speed can never be expected.

The apparatus shown in FIG. 4 of afore-mentioned Japanese Patent Laid-Open No. 194465/1983 improves the processing speed to some extent. However, processing other than the decision of the element changing point is sequentially carried out by program control and moreover, its exclusive processing circuit detects the picture element changing point on the reference line bit-serially so that its processing speed must yet be improved drastically.

SUMMARY OF THE INVENTION

The present invention is directed to drastically improve the expanding processing speed of binary image data coded in a two-dimensional compressional code such as the MR code.

In accordance with the present invention, a reference line processing circuit shifts bit-serially a reference line data and at the same time, searches for a color changing point of the reference line data at a plurality of fixed, successive element positions in parallel. An output data producing circuit produces the expanded line data of each picture element corresponding to each reference line picture element arriving at a predetermined one of the successive element positions described above, bit-serially and in synchronism with shifting of the reference line data. A code analyzing circuit analyzes an input code and produces a signal identifying the code mode and a signal designating one of the successive element positions at which the color changing point is to be detected. The latter signal is supplied to the reference line processing circuit. A control circuit receives the code mode identifying signal and a signal representing the detection of the color changing point at the designated element position, and controls the operations of the reference line processing circuit and output data producing circuit.

In one preferred embodiment for MR coded data, a color changing point is searched for in parallel at seven successive picture element positions, and the center of these seven picture element positions corresponds to the output picture element position on the expanded line. This configuration can detect the color changing point at any position within the range of three picture elements on the right and left hands of the output picture element that is being produced, and this range covers all the color changing point positions of the reference line associated with the MR code words in the vertical mode. Therefore, the production of the output line data can be started simultaneously with the end of analysis of each MR code word and there is no need to determine the color changing point position of the reference line before the start of production of the output line data. As a result, the expanding processing speed can be improved drastically.

The above and other objects, novel features and advantages of the present invention will become more apparent from the following description when taken in conjunction with the accompanying drawings.

DESCRIPTION OF THE PREFERRED EMBODIMENT

Figure 3:
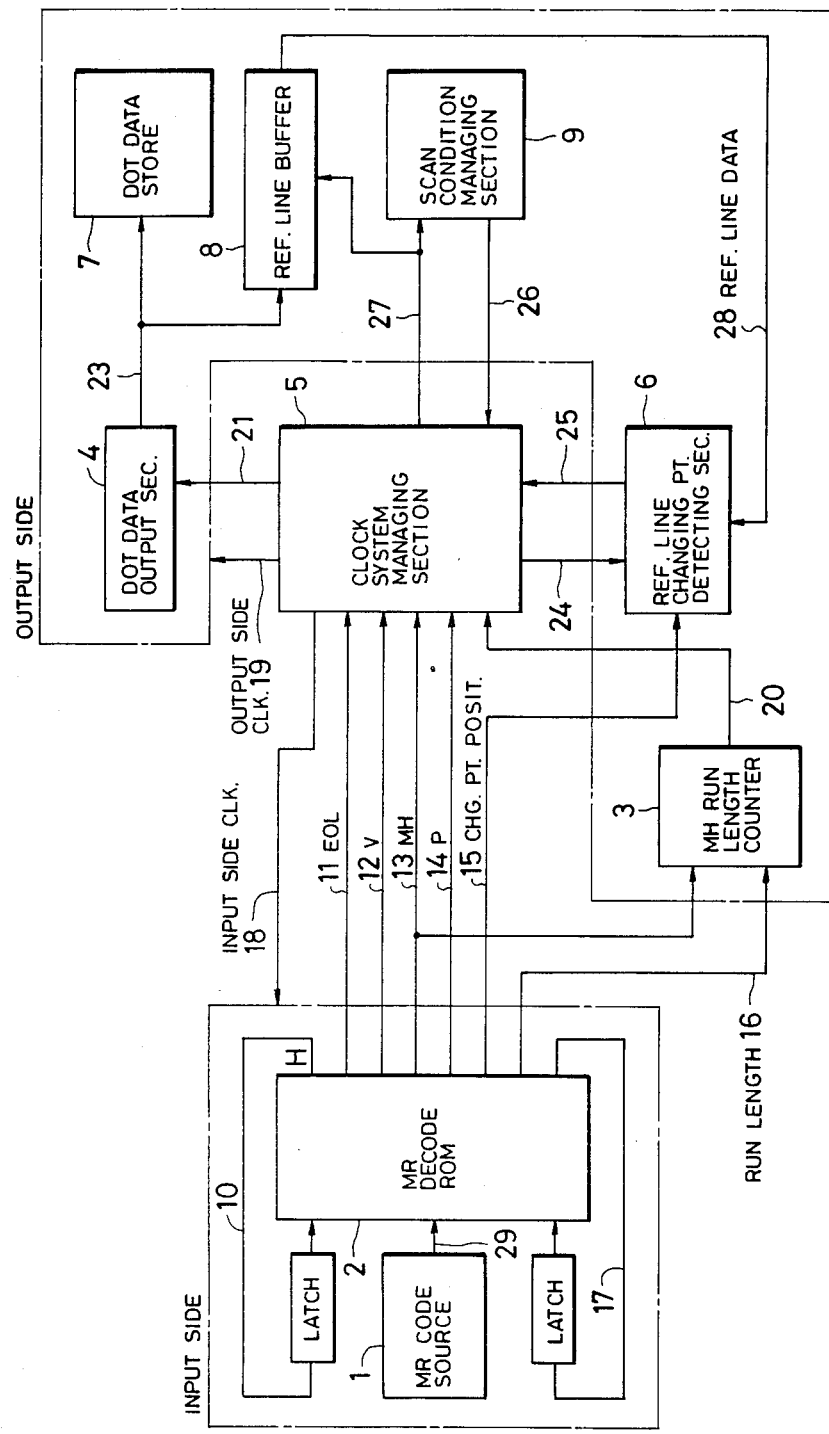
FIG. 3 is a block diagram showing one embodiment of the present invention.

FIG. 3 is a block diagram showing one embodiment of the present invention. An MR code source 1 is a facsimile signal reception circuit or a read circuit of an image data memory, for example, and supplies MR code data 29 to an MR decode ROM 2. This MR decode ROM 2 analyzes the MR code data supplied thereto with respect to the bit pattern of the MR code shown in FIG. 1B, and produces various signals 10–17 in accordance with the result of analysis. The MR code source 1 and the MR decode ROM 2 are altogether called the "input side".

An MH run length counter 3 is a counter which counts the run length represented by an MH code in the horizontal mode. A dot data output section 4 produces dot data expanded from the MR code and its output 23 is stored in a dot data store 7 as the output data and is sent also to a reference line buffer 8. The reference line buffer 8 is a FIFO memory or shift register for holding the expanded dot data of the reference line (which is the line immediately before the line which is now being expanded), and supplies bit-serially the dot data 28 of the reference line to a reference line changing point detecting section 6. The reference line changing point detecting section 6 has a color change detecting circuit and a six-stage shift register for receiving the output of the former as will be described elsewhere in further detail, and inspects in parallel the color (i.e. black or white) change of seven successive picture elements along the reference line. A scan condition managing section 9 manages the progress of the expanding processing on the basis of the number of lines (the number of scans) for which expanding processing has been finished. The MH run length counter 3, the dot data output section 4, the reference line changing point detecting section 6, the dot data store 7, the reference line buffer 8 and the scan condition managing section 9 are altogether called the "output side".

As will be described elsewhere in further detail, a clock system managing section 5 supplies an input side clock 18 or an output side clock 19, and switches a reference line changing point search mode signal 24 and an output dot black/white mode signal 21, in response to the various signals 11–14 from the MR decode ROM 2 and to the changing point detection signal 25 from the reference line changing point detecting section 6.

Figure 4:
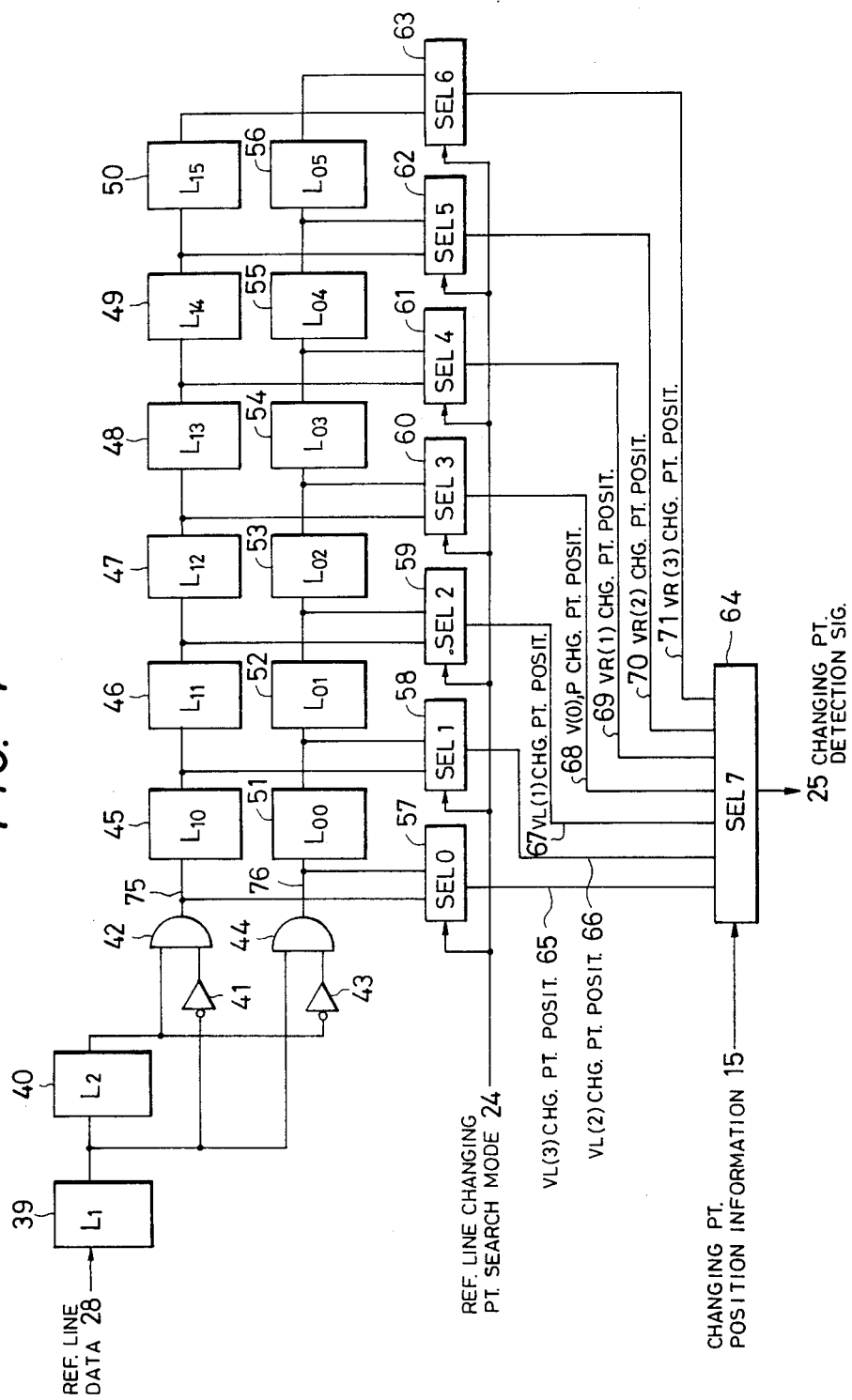
FIG. 4 is a block diagram showing in further detail a reference line changing point detection section in FIG. 1.

FIG. 4 shows in detail the reference line changing point detecting section 6. The reference line data supplied bit-serially is shifted through latches 1 (L1) 39 and 2 (L2) 40, and the black→white (H→L) changing point is detected by an inverter 41 and an AND gate 42, while the white→black (L→H) changing point is detected by an inverter 43 and an AND gate 44. The black→white changing point signal 75 is shifted through a shift register consisting of latches 10 (L10) 45–15 (L15) 50, while the white→black changing point signal 76 is shifted through a shift register consisting of latches 00 (L00) 51–05 (L05) 56. These changing point signals are bit trains which assume "1" at the element changing point and "0" at others. The shift operation is carried out in synchronism with the output side clock 19.

Selectors 0 (SEL0) 57–6 (SEL6) 63 select either the black→white changing point signal or the white→black changing point signal as their outputs 65–71 in accordance with the reference line changing point search mode signal 24. The first five pulses of the output side clock 19 after the start of the expanding processing of each line are used only to read the reference line buffer 8 and to shift in the reference line changing point detecting section 6 but are not used for producing the output 23 in the dot data output section 4 and for writing in the dot data store 7 and the reference line buffer 8. As a result, the output 23 of the dot data output section 4 has a time delay which corresponds to five bits relative to the changing point signals within the shift registers L10–L15 and L00–L05, and the changing point signal for the picture element on the reference line having the same position on the line as the output picture element (dot) that is being now produced is obtained from the outputs of L12 and L02, that is, the output 68 of SEL 3.

Figures 1A, 1B:
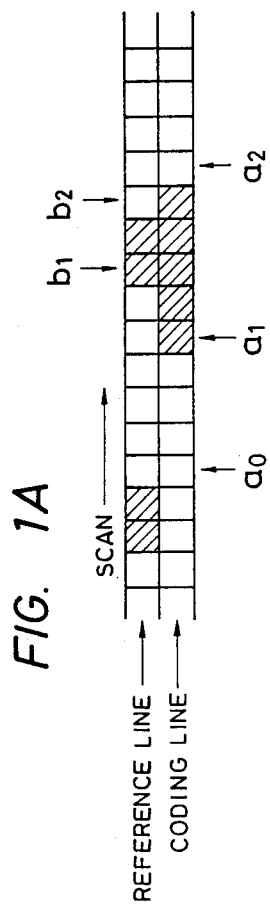
FIGS. 1A and 1B are diagrams for illustrating the MR coding rule.
Figure 1C:
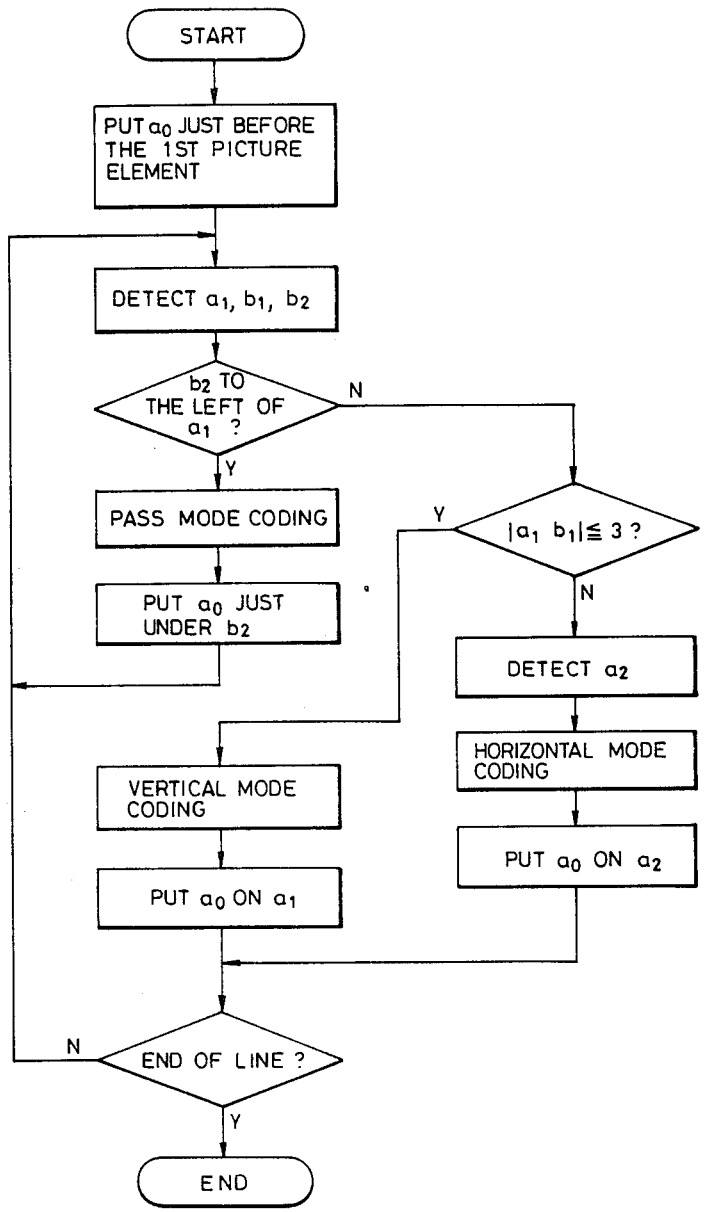
FIG. 1C is a flowchart showing an MR coding procedure.

Therefore, the outputs 65–67 of SEL0–SEL2 represent that the output picture element currently being produced lies at the third to first picture element positions, respectively, to the left (in FIG. 1A) of the changing point of the reference line, and the outputs 69–71 of SEL4–SEL6 represent that the output picture element currently being produced lies at the first to third picture element positions, respectively, to the right of the changing point of the reference line. In FIG. 4, it is to be noted that since the picture elements in the left part in FIG. 1A are first supplied and proceed to the right, the right/left relation becomes opposite to that in FIG. 1A.

The selector 7 (SEL7) 64 selects one of the outputs 65–71 of SEL0–SEL6 in accordance with changing point position information 15 and sends it as the changing point detection signal 25 to the clock system managing section 5. The changing point position information 15 is produced in accordance with the result of decoding of the MR code by the MR decode ROM 2, designates the output 68 of SEL3 for the P (pass mode) code and V (0) code and designates the outputs 65–67 and 69–71 of SEL0–SEL2 and SEL4–SEL6 for VL(3)–VL(1) and VR(1)–VR(3), respectively. For the H (horizontal mode) code, the MH run length counter 3 is used in place of the reference line changing point detecting section 6, and the changing point detection signal 25 is neglected.

It is possible to provide a single shift register which receives the outputs of AND gates 42 and 44 through an OR gate in place of the shift register (L10–L15) for the black→white changing point signal and the shift register (L00–L05) for the white→black changing point signal. The selectors (SEL0–SEL6) for switching the reference line changing point search mode are not necessary for this single shift register structure. However, the structure shown in FIG. 4 is preferable because timing control is easier.

Figure 2:
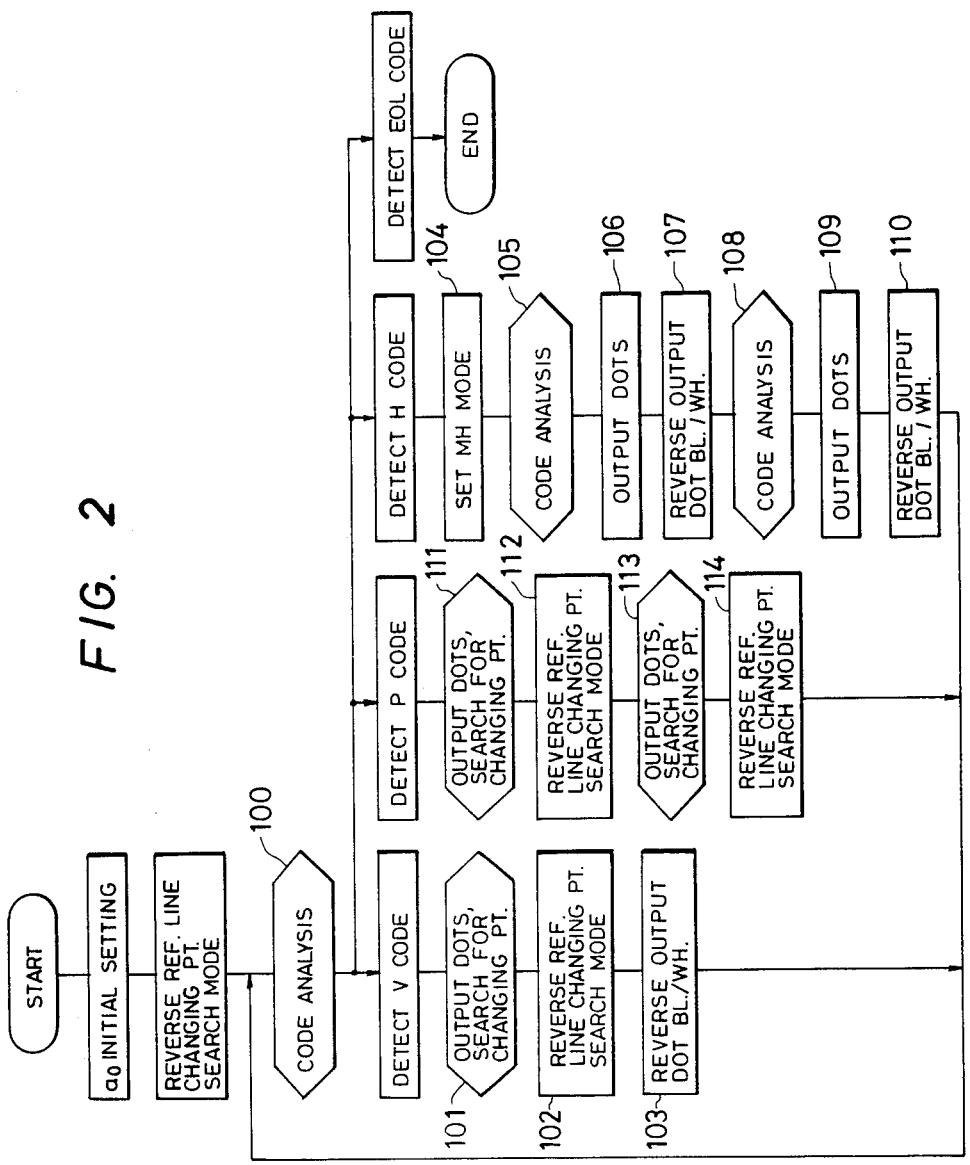
FIG. 2 is a flowchart of an expanding procedure of MR coded data.

Next, the procedures for the MR code expanding processing in the embodiment shown in FIGS. 3 and 4 will be explained with reference to FIG. 2. The detail of the clock system managing section 5 will be described later. Initially, the scan condition managing section 9 sends a single scan expansion start order 26 to the clock system managing section 5. Upon receiving this order 26, the clock system managing section 5 supplies the input side clock 18 to the MR code source 1 and the MR decode ROM 2 and the MR code source 1 supplies the MR code data 29 to the MR decode ROM 2 bit-serially and in synchronism with the input side clock 18. The MR decode ROM 2 analyzes the MR code supplied thereto, determines which of the V (vertical) mode, the H (horizontal) mode, the P (pass) mode and EOL (end of line) it represents, and produces the corresponding detection signal V, H, P or EOL (FIG. 2, 100). The V detection signal 12, the P detection signal 14 and the EOL detection signal 11 are sent to the clock system managing section 5 and the H detection signal 10 switches the MR decode ROM 2 to the MH mode. When the V mode or the P mode is detected, the changing point information 15 is further supplied to the reference line changing point detection section 6. The signal 17 is information indicating a state transition of the MR decode ROM 2. It corresponds to that part of MR code bits which have been received by the ROM 2, and is combined with a newly supplied MR code bit to determine the next output of the ROM 2. The subsequent operations will be explained dividedly with reference to the cases where the V mode, the H mode, the P mode and EOL is detected, respectively.

(1) V (vertical) mode:

Upon receiving the V detection signal 12 from the MR decode ROM 2, the clock system managing section 5 stops the input side clock 18 and supplies instantaneously the output side clock 19 to the dot data output section 4, the reference line changing point detecting section 6, the dot data store 7 and the reference line buffer 8 (FIG. 2, 101). The dot data output section 4 produces the dot data 23 of the color (black or white) indicated by the output dot black/white mode 21 in synchronism with the output side clock, and this dot data (the expanded image data) 23 is written into the dot data store 7 and the reference line buffer 8. The content of the reference line buffer 8 (that is, the dot data of the line immediately before the current line for which expansion has already been finished) is supplied bit-serially and in synchronism with the output side clock 19 to the reference line changing point detection section 6 as the reference line data 28. However, the first five output side clock pulses after generation of single scan line expansion start order 26 are inhibited with respect to the outputting from the dot data output section 4 and the writing into the dot data store 7 and the reference line buffer 8, as described already.

In the reference line changing point detecting section 6 (FIG. 4), the changing points of the reference line data 28 are sequentially detected as described already and the white→black changing point information or the black→white changing point information as the result of detection is available in parallel at the position of the output element dot currently being produced and those of three picture elements on each of the right and left hands of the former. Which of the changing points of white→black and black→white is to be searched for is designated by the reference line changing point search mode 24 from the clock system managing section 5, and the element position for detecting the changing point is designated by the changing point position information 15 which is generated as a result of analysis of one of the MR codes V (0), VR(1)–VR(3) and VL(1)–VL(3) by the MR decode ROM 2. For example, if the MR code is VR(2), that is, 000011, and the reference line changing point search mode 24 indicates searching for the white→black change, SEL7 selects the output 70 of SEL5 and SEL5 selects the output of L04. As a result, when the white→black changing point signal of the reference line reaches L04, the changing point detection signal 25 is generated. The point of time at which this changing point detection signal 25 is generated is the point at which $a_1$ is about to be generated in the case where $a_1$ is at the second picture element position to the right of $b_1$. The dot data output section 4 continues to generate the dot data 23 of the same color in synchronism with the output side clock 19 until the changing point detection signal 25 is generated.

The changing point detection signal 25 is sent to the clock system managing section 5 and the clock system managing section 5 receiving this signal stops instantaneously the output side clock 19, then produces once again the input side clock 18, starts the input 29 of the next MR code, reverses the reference line search mode 24 and the output dot black/white mode 21 and prepares for the next expanding processing (FIG. 2, 102, 103).

(2) H (horizontal) mode:

Upon detecting the H mode code (001), the MR decode ROM 2 generates the H detection signal 10, switches the table to be used from the MR decode table to the MH decode table (FIG. 2, 104) and analyzes succeedingly the code M ($a_0a_1$) (FIG. 2, 105). Then, when the analysis of the code M ($a_0a_1$) is finished, it sends the MH code detection signal 13 to the clock system managing section 5 and delivers the MH code detection signal 13 as well as the run length data 16 to the MH run length counter 3. Upon receiving the MH code detection signal 13, the clock system managing section 5 stops instantaneously the input side clock 18 and actuates the output side clock 19. When the output side clock 19 is thus actuated, the dot data output section 4 starts the output of the expanded data 23 in the same way as in the case of the V mode described already, and writes the expanded data 23 into the dot data store 7 and the reference line buffer 8 (FIG. 2, 106).

A count value is set to the MH run length counter 3 by the MH code detection signal 13 and the run length data 16 and this counter 3 starts counting in synchronism with the output side clock 19. Upon having counted a value corresponding to the set count value, the counter 3 outputs a count carry signal 20 to the clock system managing section 5. Up to this point, expansion of the picture elements immediately on the left of $a_1$ has been finished. Upon receiving the count carry signal 20, the clock system managing section 5 stops instantaneously the output side clock 19, actuates once again the input side clock 18 and at the same time, reverses the output dot black/white mode 21 (FIG. 2, 107).

Incidentally, while the output side clock 19 is being actuated, the reference line buffer 8 and the reference line changing point detecting section 6 perform the shift operation in the same way as in the V mode, but the changing point detection signal 25 is neglected.

In the manner described above, the analysis of the MH code M ($a_0a_1$) and the output of the expanded data 23 corresponding to this code are completed and subsequently, the analysis of the MH code (FIG. 2, 108) and the output of the expanded data 23 (FIG. 2, 109) are likewise effected for the MH code M ($a_1a_2$), too. However, the color of the expanded data 23 is opposite to the color of M ($a_0a_1$). When the output of the expanded data 23 is finished, change-over from the output side clock to the input side clock and reversion of the black/white mode (FIG. 2, 110) are effected and at the same time, the table used inside the MR decode ROM 2 is switched from the MH decode table to the MR decode table to shift to the input of the next MR code and its analysis.

(3) P (pass) mode:

Upon receiving the P detection signal 14, the clock system managing section 5 stops instantaneously the input side clock 18 and supplies the output side clock 19 so that the operations of the dot data output section 4, the dot data store 7, the reference line buffer 8 and the reference line changing point detecting section 6 are started in the same way as in the V mode described already (FIG. 2, 111). The changing point position information 15 designates the output 68 of SEL3. The changing point detection signal 25 that is produced first represents the arrival at the position of $b_1$, and upon receiving this signal, the clock system managing section 5 reverses the reference line changing point search mode 24 and continues to supply the output side clock 19. The output dot black/white mode 21 is not changed (FIG. 2, 112).

The reference line changing point detection section 6 continues to shift and to search for the changing point (FIG. 2, 113) in accordance with the reversed changing point search mode 24 and, when it detects the changing point, sends the changing point detection signal 25 to the clock system managing section 5. The changing point detected this time is $b_2$. Upon receiving this second changing point detection signal 25, the clock system managing section 5 stops instantaneously the output side clock 19 and supplies once again the input side clock 18 and at the same time, changes once again the reference line changing point search mode 24 to shift to the input of the next MR code and its analysis (FIG. 2, 114).

(4) EOL:

Upon receiving the EOL detection signal 11 from the MR decode ROM 2, the clock system managing section 5 stops the input side clock 18 and the output side clock 19 and outputs a single scan expansion end signal 27 to the scan condition managing section 9. The scan condition managing section 9 manages the number of scan lines which have been expanded and, if the number does not reach a predetermined image scan number, it issues once again the single scan expansion start order 26 to the clock system managing section 5.

Figure 5:
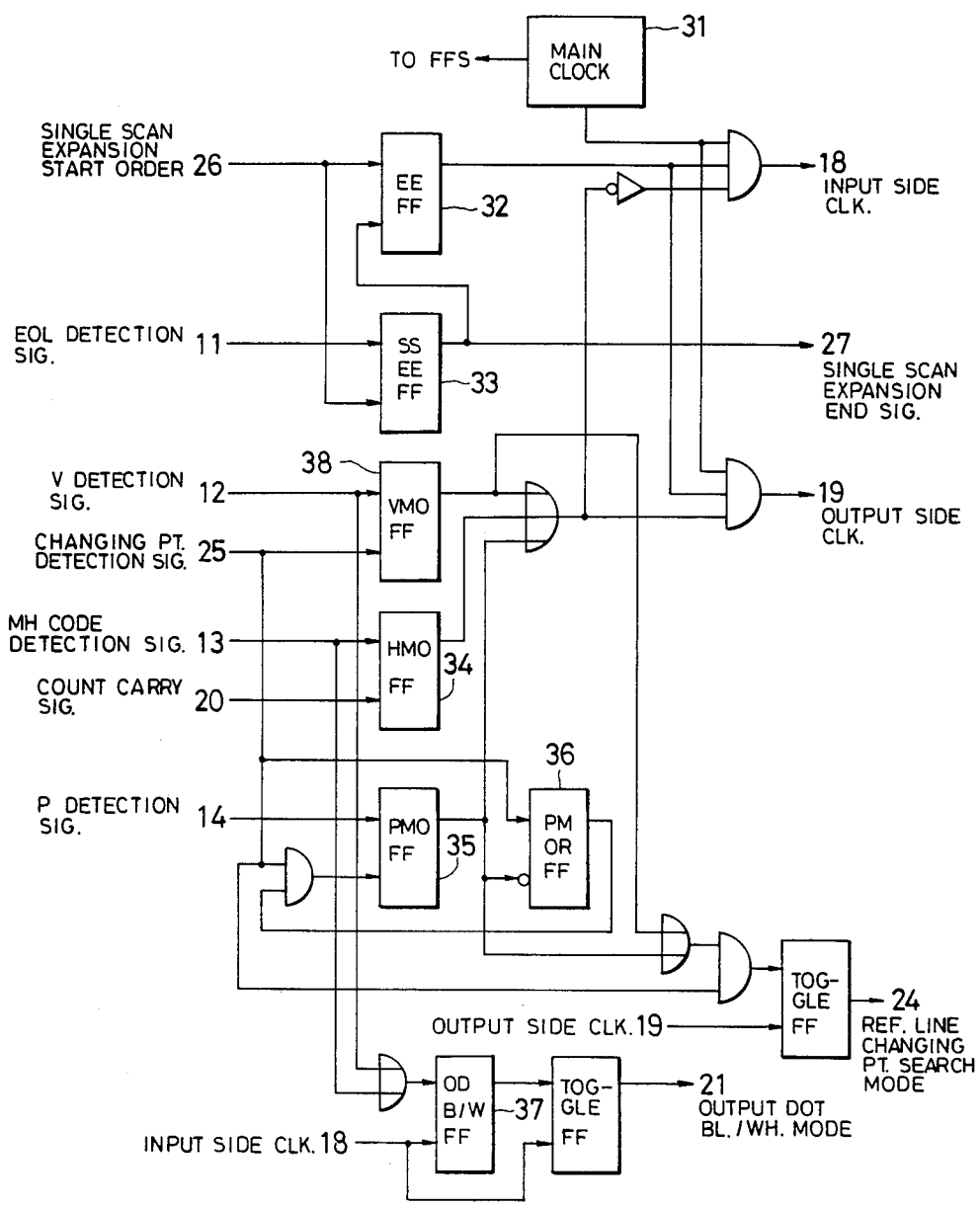
FIG. 5 is a block diagram showing in further detail a clock system management section in FIG. 1.

FIG. 5 shows in detail the clock system managing section 5. In FIG. 5 and the following description, the symbol FF represents a flip-flop. An expansion execute FF (EE FF) 32 is set by the single scan expansion start order 26 and produces the input side clock 18 which is in synchronism with the main clock 31. A V mode output FF (VMO FF) 38 is set by the V detection signal 12 to stop the input side clock 18 and produce the output side clock 19 which is in synchronism with the main clock 31, and is reset by the changing point detection signal 25 to stop the output side clock 19 and restore the input side clock 18. A H mode output FF (HMO FF) 34 is set by the MH code detection signal 13 to stop the input side clock 18 and produce the output side clock 19, and is reset by the count carry signal 20 to stop the output side clock 19 and restore the input side clock 18.

A P mode output FF (PMO FF) 35 is set by the P detection signal 14 to stop the input side clock 18, produce the output side clock 19 and deenergize the reset input of the P mode output reset FF (PMOR FF) 36. The changing point detection signal 25 that occurs first thereafter sets this P mode output reset FF 36 and the second changing point detection signal 25 resets the P mode output FF 35 so that the output side clock 19 is stopped and the input side clock 18 is restored. At the same time, the P mode output reset FF 36 is reset. These FFs 32, 34–36, 38 and the later-appearing FF 33 are JK flip-flops that are actuated by the main clock 31.

The reference line changing point search mode signal 24 is reversed by the output side clock 19 immediately after the generation of the changing point detection signal 25 when the V mode output FF 38 or the P mode output FF 35 is in the set state. The output dot white/black FF (ODB/W FF) 37 is an RS flip-flop which is set by the V detection signal 12 or the MH code detection signal 13, and is reset by the first input side clock 18 that occurs thereafter. The moment this flip-flop is reset, the output dot white/black mode signal 21 is reversed.

A single scan expansion end FF (SSEE FF) 33 is set by the EOL detection signal 11 to produce the single scan expansion end signal 27 and reset simultaneously the expansion execute FF 32, thereby stopping the input side clock 18 and the output side clock 19.

In a modification, there may be provided a counter for counting the expanded data 23 in synchronism with the output side clock 19, and a detector for generating a signal when this counter has just counted up to a value corresponding to the number of picture elements on an entire scan line. This signal from the detector can be used in place of the EOL detection signal 11.

Figure 6:
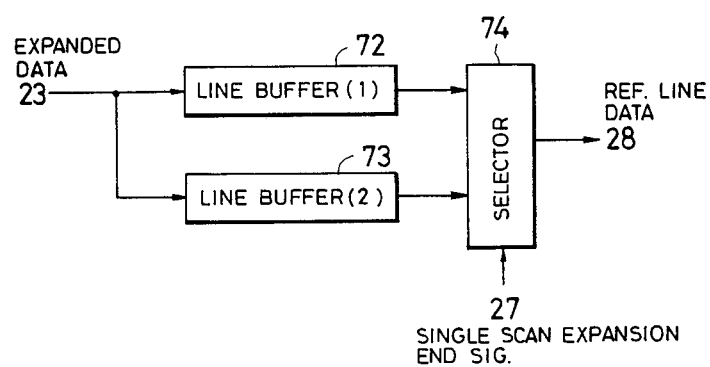
FIG. 6 is a block diagram showing in more detail a reference line buffer in FIG. 1.

As shown in FIG. 6, the reference line buffer 8 is a double buffer of the type wherein a line buffer (1) 72 and a line buffer (2) 73 are switched by a selector 74. While the expanded data 23 is written into one of the line buffers, the expanded data of the previous line is read out as the reference line data 28 from the other line buffer. Change-over of the line buffers (1) and (2) is made in response to the single scan expansion end signal 27.

In the embodiment described above, the generation of the output dot train is started immediately after the end of analysis of each MR code word and the generation of the output dots having the same color are thereafter continued until the color changing point of the reference line is detected. Therefore, expansion of the image data compressed by the MR code can be executed at a high speed and an image of an A-4 size having a line density of 8 lines/mm can be processed within one second.

While a preferred embodiment of the invention has been described, it is to be understood that the present invention is not limited thereto, in particular, but various changes and modifications can be made by those skilled in the art without departing from the spirit or scope of the following claims.

What is claimed is:

1. A method for expanding coded binary image data coded according to a line-by-line coding method in which the position of each color changing picture element on a coding line is coded in one of a plurality of code modes with respect to the position of a corresponding reference picture element situated on either the coding line or a reference line which lies immediately above the coding line, said method for expanding comprising the steps of:

analyzing each input code and producing a signal for identifying the corresponding code mode and a signal for designating a reference line picture element position at which a color changing point is to be detected;

shifting the reference line data bit-serially and at the same time searching for the color changing point of the reference line data at a plurality of successive picture element positions in parallel;

producing a changing point detection signal representing that the color changing point is detected at one of said successive picture element positions designated by said designating signal;

producing, bit-serially and in synchronism with said shifting of the reference line data, expanded line data of each picture element which corresponds to each reference line picture element arriving at a predetermined one of said successive picture element positions;

controlling said shifting and searching step and both of said producing steps in response to said code mode identifying signal and said changing point detection signal; and said shifting and searching step including a first detecting step of detecting a color change in a certain direction between each reference line picture element and its preceding picture element, a second detecting step of detecting a color change in the opposite direction between each reference line picture element and its preceding picture element, a first shifting step of shifting changing point signals obtained by said first detecting step along a first path, a second shifting step of shifting changing point signals obtained by said second detecting step along a second path, and a step of reading the shifted changing point signals simultaneously at a plurality of successive positions along a selected one of said first and second paths.

2. A method as claimed in claim 1, wherein said controlling step for controlling said expanded line data producing step includes a step of designating a color to be indicated by said expanded line data.

3. A method as claimed in claim 1, wherein said controlling step includes a step of controlling said analyzing step alternately with said shifting and searching step and both of said producing steps.

4. A method for expanding coded binary image data coded according to a line-by-line coding method in which the position of each color changing picture element on a coding line is coded in one of a plurality of code modes with respect to the position of a corresponding reference picture element situated on either the coding line or a reference line which lies immediately above the coding line, said method for expanding comprising the steps of:

analyzing each input code and producing a signal for identifying the corresponding code mode and a signal for designating a reference line picture element position at which a color changing point is to be detected;

shifting the reference line data bit-serially and at the same time searching for the color changing point of the reference line data at a plurality of successive picture element positions in parallel;

producing a changing point detection signal representing that the color changing point is detected at one of said successive picture element positions designated by said designating signal;

producing, bit-serially and in synchronism with said shifting of the reference line data, expanded line data of each picture element which corresponds to each reference line picture element arriving at a predetermined one of said successive picture element positions;

controlling said shifting and searching step and both of said producing steps in response to said code mode identifying signal and said changing point detection signal; and wherein said coding method in MR coding method involving a code mode in which the relative distance between a color changing picture element on the coding line and a reference color changing picture element on the reference line is less than four, said color changing point is simultaneously searched for at seven successive picture element positions in said shifting and searching step, and the picture element of the data produced in said expanded line data producing step corresponds to the reference line picture element arriving at the center of said seven successive picture element positions.

5. An apparatus for expanding coded binary image data coded according to a line-by-line coding method in which position of each color changing picture element on a coding line is coded in one of code modes with respect to the position of a corresponding reference picture element situated on either the coding line or a reference line which lies immediately above the coding line, said apparatus comprising:

a code analyzing circuit for analyzing each input signal and producing a signal identifying the corresponding code mode and a signal designating a reference line picture element position at which a color changing point is to be detected;

a reference line processing circuit for shifting reference line data bit-serially and concurrently searching for the color changing point of the reference line data at a plurality of successive picture element positions in parallel to output a changing point detection signal representing that the color changing point is detected at one of said successive element positions designated by said designating signal;

an output data producing circuit for producing, bit-serially and in synchronism with said shifting of the reference line data, expanded line data of each picture element which corresponds to each reference line picture element arriving at a predetermined one of said successive picture element positions;

a reference line buffer connected to said reference line processing circuit and to said output data producing circuit for holding said expanded line data from said output data producing circuit and supplying it to said reference line processing circuit as next reference line data;

a controlling circuit connected to said code analyzing circuit, said reference line processing circuit, said output data producing circuit and said reference line buffer for controlling the operations of said reference line processing circuit, said output data producing circuit and said reference line buffer in response to said code mode identifying signal from said code analyzing circuit to said changing point detection signal from said reference line processing circuit; and said reference line processing circuit involving first detecting means for detecting a color change in a certain direction between each reference line picture element and its preceding picture element, second detecting means for detecting a color change in the opposite direction between each reference line picture element and its preceding picture element, first and second multistage shifting means for receiving and shifting the outputs of said first and second detecting means, respectively, selecting means responsive to said designating signal for selecting one of the successive stages of either said first or second shifting means from which the changing point detection signal is to be fed out, and means for connecting selectively one of said first and second shifting means to said selecting means in response to a changing point search mode signal from said controlling circuit.

6. An apparatus as claimed in claim 5, wherein said control circuit supplies a signal which designates a color to be indicated by said expanded line data to said output data producing circuit.

7. An apparatus as claimed in claim 6, wherein said control circuit controls the operation of said code analyzing circuit alternately with the operations of said reference line processing circuit, said output data producing circuit and said reference line buffer.

8. An apparatus as claimed in claim 7, wherein said control circuit includes means for generating a train of clock signals, a bistable element which is switched to a first stable state by said code mode identifying signal for a certain code mode and to a second stable state by said changing point detection signal, means for supplying said clock signals to said reference line processing circuit, said output data producing circuit and said reference line buffer when said bistable element is in the first stable state and for supplying said clock signals to said code mode analyzing circuit when said bistable element is in the second stable state, and means for switching said color designating signal when said bistable element is switched to said second stable state.

9. An apparatus as claimed in claim 5, wherein said control circuit includes means for generating a train of clock signals, a bistable element switched to a first stable state by the code mode identifying signal for a certain code mode and to a second stable state by the changing point detection signal, means for supplying said clock signals to said reference line processing circuit, to said output data producing circuit and to said reference line buffer when said bistable element is in the first stable state, and for supplying said clock signals to said code mode analyzing circuit when said bistable element is in the second bistable state, means for switching said color designating signal when said bistable element is switched to the second stable state, and means for switching said changing point search mode signal when said bistable element is switched to the second stable state.

10. An apparatus for expanding coded binary image data coded according to a line-by-line coding method in which position of each color changing picture element on a coding line is coded in one of code modes with respect to the position of a corresponding reference picture element situated on either the coding line or a reference line which lies immediately above the coding line, said apparatus comprising:

a code analyzing circuit for analyzing each input signal and producing a signal identifying the corresponding code mode and a signal designating a reference line picture element position at which a color changing point is to be detected;

a reference line processing circuit for shifting reference line data bit-serially and concurrently searching for the color changing point of the reference line data at a plurality of successive picture element positions in parallel to output a changing point detection signal representing that the color changing point is detected at one of said successive element positions designated by said designating signal;

an output data producing circuit for producing, bit-serially and in synchronism with said shifting of the reference line data, expanded line data of each picture element which corresponds to each reference line picture element arriving at a predetermined one of said successive picture element positions;

a reference line buffer connected to said reference line processing circuit and to said output data producing circuit for holding said expanded line data from said output data producing circuit and supplying it to said reference line processing circuit as next reference line data;

a controlling circuit connected to said code analyzing circuit, said reference line processing circuit, said output data producing circuit and said reference line buffer for controlling the operations of said reference line processing circuit, said output data producing circuit and said reference line buffer in response to said code mode identifying signal from said code analyzing circuit and to said changing point detection signal from said reference line processing circuit; and wherein said coding method is a MR coding method involving a code mode in which the relative distance between a color changing picture element on the coding line and a reference color changing picture element on the reference line is less than four, and said reference line processing circuit includes means for searching for the color changing point at seven successive picture element positions in parallel, and said output data producing circuit includes means for producing the expanded line data of each picture element which corresponds to each reference line picture element arriving at the center of said seven successive picture element positions.

* * * * *